United States Patent [19]
Nakajima et al.

[11] 3,742,828
[45] July 3, 1973

[54] CAMERA HAVING MEANS FOR COMPUTING A FLASH GUIDE NUMBER

[75] Inventors: Tohru Nakajima; Chiharu Mori, both of Tokyo; Masatoshi Marui, Saitama, all of Japan

[73] Assignee: Asaki Kogaku Kogyo Kabushiki Kaisha, Tokyo-to, Japan

[22] Filed: Jan. 26, 1972

[21] Appl. No.: 220,915

[30] Foreign Application Priority Data
Feb. 12, 1971 Japan.................................. 46/6014

[52] U.S. Cl. ............................................ 95/10 CE
[51] Int. Cl. ............................................ G03b 1/44
[58] Field of Search .................... 95/10 CT, 10 CE, 95/11.5 R; 355/69; 315/241 P

[56] References Cited
UNITED STATES PATENTS
3,545,858  12/1970  Childers........................... 355/69 X
3,611,159  10/1971  Florsheim et al................. 355/69 X Primary Examiner—Samuel S. Matthews
Assistant Examiner—Michael L. Gellner
Attorney—Harold D. Steinberg et al.

[57] ABSTRACT

A camera which is capable of automatically computing a flash guide number. The camera has electronic input structure connected electrically with a computing structure for supplying to the latter signals in accordance with the APEX system and corresponding to a selected aperture setting, a selected distance setting, and a selected film speed setting. The computing structure computes a flash guide number in accordance with these signals. An electrical flash unit is provided for providing flash illumination, and the flash unit is electrically connected with the computing structure so as to determine the amount of flash illumination in accordance with the flash guide number which is computed by the computing structure.

4 Claims, 4 Drawing Figures

CAMERA HAVING MEANS FOR COMPUTING A FLASH GUIDE NUMBER

BACKGROUND OF THE INVENTION

The present invention relates to cameras.

In particular, the present invention relates to camera structure for providing flash illumination.

Thus, the present invention relates to electronic flash control means associated with a camera and operating in synchronism with operation of the camera in accordance with information determined by the aperture setting of the diaphragm, the setting for distance between the object and the camera, as determined by focusing, and in accordance with the speed of the film which is exposed in the camera.

Conventional electronic flash apparatus operate according to a predetermined guide number G. The operator of the apparatus selects the aperture setting A in such a way that the product of the value A, corresponding to the aperture setting, and the distance D between the object and the camera always equals G. In other words the following relation is satisfied:

$$G = A \cdot D \quad (1)$$

In recent times, automatic electronic flash apparatus have been widely used. With an apparatus of this latter type, a diaphragm value is first set into the camera, and then either the electrical discharge of the flash apparatus is terminated or quenching is carried out by shunting when the integrated value of the reflected light resulting from the flash and received by the camera objective reaches a value which provides a proper exposure as determined by the speed of the film and the setting of the diaphragm. Alternatively, when a camera has an objective diaphragm which can be readily controlled, it is known to automatically provide a proper diaphragm setting with a given distance setting $D$ in accordance with the above relation (1).

However, in the case of single lens reflex cameras which use interchangeable objectives, it is not possible to provide automatic controls for the diaphragm in an easy manner. Therefore, in applying the relation (1), set forth above, the diaphragm setting $A$ is first set and then $D$ is determined. Thereafter the electronic flash apparatus is actuated with the guide number $G = A \cdot D$.

SUMMARY OF THE INVENTION

It is accordingly a primary object of the present invention to avoid the above drawbacks.

Accordingly, it is an object of the invention to provide for a camera a control system having a photographic computing section and connecting the electronic flash apparatus, which is a controlled system, to the camera which serves as a source of information providing signals according to which the controls are carried out.

In particular, it is an object of the present invention to provide for a camera an electronic structure which is capable of automatically determining a flash guide number $G$ which will provide a proper exposure.

Another object of the invention is to provide a construction which does not require a rapid response in the flash guide number control. Such a rapid response has been conventionally required with known structures.

Also it is an object of the present invention to provide a structure which eliminates the requirement of troublesome manipulation involved in the necessity of introducing both the speed of the film and the aperture setting in the camera and in the electronic flash apparatus.

Thus, it is an object of the present invention to provide a structure which requires only that settings of the above type be made in the camera, so as to render the manipulations far simpler than has heretofore been possible.

Yet another object of the present invention is to provide a camera where the diaphragm can be freely adjusted as desired so that proper exposure can be obtained without any complicated manipulations. This is in contrast with conventional electronic flash apparatus where a fixed, predetermined diaphragm setting is essential so that the flash guide number may then be determined in accordance with the distance between the camera and the object which is photographed. Also, this is in contrast with known apparatus where the guide member is fixed and the diaphragm is automatically controlled in accordance with the setting of the distance between the camera and the object.

Thus, the objects of the present invention include the provision of a camera which enables the objective diaphragm to be freely set as desired so that with the apparatus of the present invention it is possible to use the camera in a highly flexible manner enabling a far more effective photographing operation to be carried out than was heretofore possible.

Therefore, it is an object of the invention to provide an electronic flash apparatus which will function in a fully automatic manner with any diaphragm setting, any film speed, and with any setting of the distance between the camera and the object which is photographed.

In accordance with the invention the camera has an electrical computing means for computing a flash guide number. An electronic input means is connected electrically with the computing means for supplying to the latter signals corresponding to a selected aperture setting, a selected distance setting, and a selected film speed setting. The computing means computes a flash guide number in accordance with these signals. An electronic flash means is provided to achieve flash illumination, and this electronic flash means is electrically connected with the computing means to determine the amount of flash illumination in accordance with the flash guide number computed by the computing means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
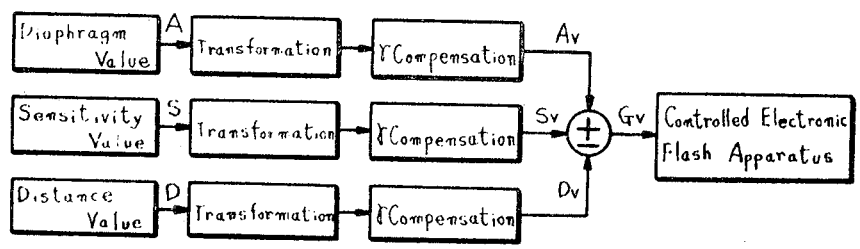
FIG. 1 is a block diagram illustrating the controls of the present invention.

Modern cameras operate with variables such as brightness B at the object which is to be photographed, diaphragm or aperture setting value A, with the diaphragm situated in the objective, the speed S of the film which is exposed in the camera, and the exposure time T. These variables are treated in such a way as to satisfy the following relation:

$$T_v + A_v = B_v + S_v \tag{2}$$

The subscript $v$ indicates that the items $T$, $A$, $B$, and $S$ are logarithmic representations having a base 2. This additive representation of photographic variables is in accordance with the APEX system. The American Standards Association has approved exposure computer and meter markings with nomenclature which may be according to the additive APEX system, with the latter abbreviation indicating the additive system of photographic exposure. Thus the nomenclature for exposure parameters can be set forth in accordance with the additive (APEX) system. In connection with electronic flash apparatus as used with cameras, the common variables with respect to exposure are the speed or sensitivity S of the light-sensitive material which is formed by the film which is exposed and the aperture or diaphragm setting A. These variables used in connection with electronic flash apparatus and the camera must be treated in a uniform manner.

Therefore, as preparation, it is proposed that the exposure distance $D$ ($m$) and the guide number $G$ ($m$) be represented according to the APEX system. The guide number G and the speed S of the film have with respect to each other the following relation:

$$G = A \cdot D = \sqrt{2\pi k c v^2 S} \tag{3}$$

where $C$ is the capacitance of a capacitor whose charge is used to illuminate the source of illumination, $v$ is the voltage across the terminals of the capacitor, $k$ is a constant determined by the efficiency of the discharge tube which forms the source of illumination, the efficiency of the reflecting mirror, etc., and $S$ is the speed of the film.

In the list which follows, the flash guide number $G$ and the distance $D$ from the camera to the object are set forth according to the APEX system. Then, the relation between the variables $A$, $B$, $S$, $T$, $D$ and $G$ can be handled in a uniform manner using the corresponding values $A_v B_v$, $S_v$, $T_v$, $D_v$ and $G_v$ according to the APEX system.

| APEX Represented Value | Diaphragm Value | A S A | Time(s) (s) | Distance (m) | Guide Number |
|---|---|---|---|---|---|
| 0 | 1 | 3 | 1 | 1 | 1 |
| 1 | 1.4 | 6 | ½ | 1.4 | 1.4 |
| 2 | 2 | 12 | ¼ | 2 | 2 |
| 3 | 2.8 | 25 | ⅛ | 2.8 | 2.8 |
| 4 | 4 | 50 | 1/15 | 4 | 4 |
| 5 | 5.6 | 100 | 1/30 | 5.6 | 5.6 |
| 6 | 8 | 200 | 1/60 | 8 | 8 |
| 7 | 11 | 400 | 1/125 | 11 | 11 |
| 8 | 16 | 800 | 1/250 | 16 | 16 |
| 9 | 22 | 1600 | 1/500 | 22 | 22 |
| 10 | 32 | 3200 | 1/1000 | 32 | 32 |
| 11 | 45 | 6400 | 1/2000 | 45 | 45 |

Assuming that the distance $D$ and the guide number $G$ are $D_v$ and $G_v$, respectively, according to the APEX system, then the above relation (3) becomes according to the APEX system:

$$G_v = A_v + D_v - (S_v - 5) \tag{4}$$

This relationship in accordance with the APEX system represents the fundamental relationship between the guide number and the photographic variables utilized in connection with camera operation to make an exposure.

If $S_v$, $A_v$, and $D_v$ are assumed so as to have given, preselected values, then it is possible to calculate $G_v$ from the above relation (4). If $A_v$, $S_v$ and $D_v$ are provided in accordance with quantities which are transformed into corresponding electrical signals in the form of electrical quantities having magnitudes corresponding to the selected values, then the relationship (4) represents an equation by which an electrical quantity $G_v$ corresponding to the guide number G may be obtained by computation carried out electronically with the latter electrical signals which correspond to the selected values of the variables. Then it is possible to actuate an electronic flash apparatus with the calculated guide number $G_v$ in the form of an electrical signal, so as to obtain a proper exposure of the film.

Referring now to FIG. 1 which shows in a block diagram one embodiment of a structure according to the present invention, it will be seen that the several variable values such as the diaphragm value, the sensitivity or speed value, and the distance value form an input means which is preferably an electronic input means, as set forth below, providing the input signals according to the selected values of the variables $A$, $S$, $D$. Transformation blocks which receive these signals represent a section of the apparatus where mechanical deflection of a given quantity is transformed into a corresponding electrical quantity by adjustment of an electrical structure. For example when the diaphragm ring is turned to set a selected aperture or diaphragm value $A$ into the camera, the turning of the diaphragm ring may be used to adjust a variable resistor which is connected to the diaphragm ring so as to provide a predetermined voltage which may be varied in this way so as to provide an electrical signal whose quantity corresponds to the selected aperture. The $\gamma$ compensation blocks represent part of the structure which provides compensation to convert electrical quantities into which the settings are transformed into uniform units so that the units of the transformed quantities are all equal. In this way it is possible to carry out the computations. The circle having the plus and minus signs represents the electrical computing means which receives the signals $A_v$, $S_v$, and $D_v$ from the electronic input means, and this computing means carries out the computation in accordance with the above relation (4) so that the computing means has an output $G_v$ corresponding to the flash guide number represented according to the APEX system. This output voltage or current provided by the computing means is received by the electronic flash means represented by the block at the right of FIG. 1, so that this latter flash means is controlled by the flash guide number calculated by the computing means in accordance with the signals transmitted to the computing means by the electronic input means. The output $G_v$ may be coupled to the electronic flash means in any suitable manner. Also, the electronic flash means shown by the block at the right of FIG. 1 may be of any type such as, for example, a flash means having a shunt quenching system using a quenching tube, a flash means having a series-control system using a silicon controlled rectifier element, or simply an entirely mechanical system where part of the discharge tube is covered, as well as a flash system where C or V is varied, etc.

Figure 2:
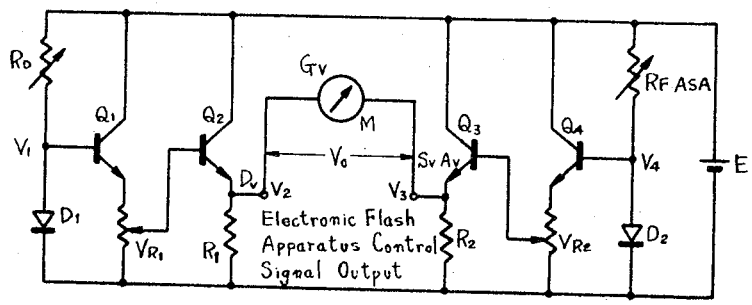
FIG. 2 is an electrical circuit illustrating one embodiment of the invention.

Reference is now made to FIG. 2 where the embodiment shown in the block diagram of FIG. 1 is illustrated in the form of an electrical wiring diagram, so that the embodiment of FIG. 2 also provides an electrical computation of the selected values of the variables, namely, the diaphragm or aperture setting value, the film speed value, and the distance value, so as to achieve the guide number $G_v$, according to the APEX system. As may be seen from FIG. 2, a variable resistor $R_D$ is adjusted in accordance with the distance setting D between the camera and the object, as determined by focusing of the camera. This variable resistor $R_D$ is electrically connected with the logarithmic transformation element $D_1$, as illustrated, so as to achieve at a junction between the components $R_D$ and the element $D_1$ a voltage output $V_1$ which is proportional to the logarithm of the distance value obtained across the logarithmic transformation element $D_1$.

This voltage output $V_1$ is applied to the base of a variable gain amplifier (an emitter follower circuit) formed by the transistor $Q_1$ and a variable resistor $VR_1$. In addition, through a buffer circuit (an emitter follower circuit) formed by the transistor $Q_2$ and a resistor $R_1$, the voltage $V_1$ is converted to an output voltage $V_2$ which is provided across the resistor $R_1$.

A variable resistor $R_{F\ ASA}$, which is set both in accordance with the aperture setting A and in accordance with the film speed S (in this example $A^2/S$), is electrically connected to a logarithmic transformation element $D_2$ as illustrated in FIG. 2 just to the left of the current source E. In this way an output voltage $V_4$ is provided with this latter voltage $V_4$ being proportional to the logarithm of the above computed value $A^2/S$, this voltage being produced across the logarithmic transformation element $D_2$. The voltage output $V_4$ is applied to the base of a variable gain amplifier (an emitter follower circuit) formed by the transistor $Q_4$ and the variable resistor $VR_2$, and then through a buffer circuit (an emitter follower circuit) formed by the transistor $Q_3$ and a resistor $R_2$ there is achieved an output voltage $V_3$ across the resistor $R_2$. The voltage $V_3$ thus corresponds to the signals $A_v$ and $S_v$ of FIG. 1 which are delivered to the computing means of FIG. 1, while the voltage $V_2$ of FIG. 2 corresponds to the signal $D_v$ delivered to this computing means of FIG. 1. Thus, the voltage output $V_2$ corresponds to the logarithmic compression of the distance setting D and the voltage output $V_3$ represents the logarithmic compression of the photographically computed value in connection with the aperture setting A and the film speed S. The γ compensation compensates for the logarithmic transformation (compression) characteristics of the voltage outputs $V_2$ and $V_3$ so that they satisfy the above respective values according to the APEX system. The circuit structure used to achieve this γ compensation is as follows: for the distance value, proper adjustment is made of the resistance characteristics of the variable resistor $R_D$, the logarithmic transformation (compression) characteristic of the logarithmic transformation element $D_1$ and the gain of the variable gain amplifier formed by the transistor $Q_1$ and the variable resistor $VR_1$. For the diaphragm or aperture value and the film speed value, proper adjustment is made of the resistance characteristic of the variable resistor $R_{F\ ASA}$, the logarithmic transformation (compression) characteristic of the logarithmic transformation element $D_2$ and the gain of the variable gain amplifier formed by the transistor $Q_4$ and the variable resistor $VR_2$.

As a result, the voltage output $V_2$ is in the form of an electrical amount or quantity corresponding to the value $D_v$ of the distance value D according to the APEX system, and the voltage output $V_3$ is in the form of an electrical quantity corresponding to the value $(S_v - A_v)$ with the values of the diaphragm setting A and the film speed S respectively represented by values $A_v$ and $S_v$ according to the APEX system.

In the example illustrated in FIG. 2 a linear meter M is connected into the circuit as illustrated to measure the voltage difference $V_0$ between the voltage outputs $V_2$ and $V_3$, this voltage difference $V_0$ being a voltage value which corresponds to the guide number $G_v$ in the form of an electrical quantity represented according to the APEX system, as indicated by the above equation (4). Accordingly, the measurement of the voltage difference $V_0$ by means of the linear meter M provides the value $G_v$ which is indicated by a scale having uniform graduations. It is then possible to actuate an electronic flash apparatus with a flash guide number which corresponds to this value $G_v$ determined by the voltage difference $V_0$, and thus the film can be properly exposed.

With a camera which already has an electronically controlled shutter the electronic control means for controlling the electronic shutter-operating means already has structure for providing the signals $A_v$ and $S_v$, so that since these latter electronic inputs are already in the camera, they may be used both for the shutter controls when exposure is made without flash as well as for control of the flash apparatus when the latter is operated, so that in this way certain simplifications are achieved.

Figure 3:
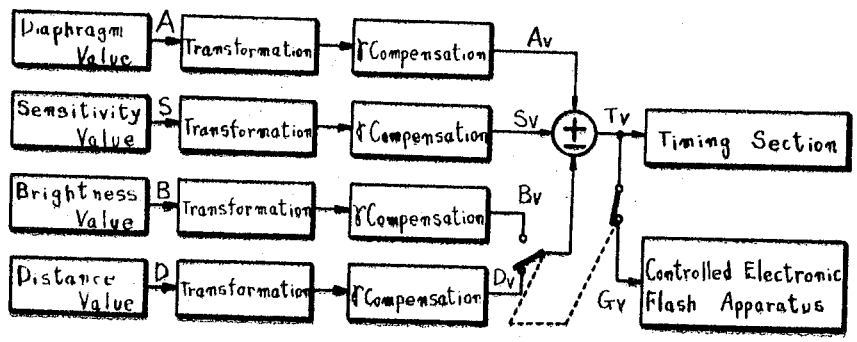
FIG. 3 is a block diagram of a camera having both an electronically controlled shutter as well as the electronic flash apparatus which operates automatically.

An arrangement of this latter type is illustrated in the block diagram of FIG. 3. It will be seen that the block diagram of FIG. 3 differs from that of FIG. 1 only in that there is an additional brightness variable value B and the computing means is also capable of transmitting a signal $T_v$ to the illustrated timing section. The structure for introducing the brightness variable B and the structure for introducing the distance variable D can be selectively connected into the circuit with the switch illustrated, this switch being controlled simultaneously with a switch which connects the electronic flash apparatus into the circuit simultaneously with the connection of the distance value structure into the circuit. When the brightness value structure is connected into the circuit the electronic flash is disconnected from the circuit.

Thus, with this arrangement of FIG. 3 when the camera is to be operated without the electronic flash apparatus, the photographic variables of object brightness B, diaphragm setting A, and film speed S, as well as the exposure time T are transformed into electrical quantities in accordance with the APEX system having the values $B_v$, $A_v$, $S_v$, and $T_v$. Then the computing means computes the value $T_v$ according to the formula $T_v = B_v + S_v - A_v$, and in this way the computing means delivers to the timing section the value $T_v$ which will achieve a proper exposure for the particular speed of the film.

When the camera is to be operated with the electronic flash apparatus, then the distance value D is used instead of the object brightness value B, by arranging the switch as illustrated in FIG. 3. Now the structure of FIG. 3 will operate in the same way as the above-described structure of FIGS. 1 and 2 bringing about a transformation into electrical quantities corresponding to the values $D_v$, $A_v$, $S_v$ and $G_v$ of the several photographic variables in accordance with the APEX system. The computation $G_v = D_v + A_v - S_v + 5$ is carried out and then in the electronic flash section suitable controls are introduced to achieve a flash with a guide number corresponding to the computed value $G_v$, so that the film is properly exposed in a fully automatic manner.

Figure 4:
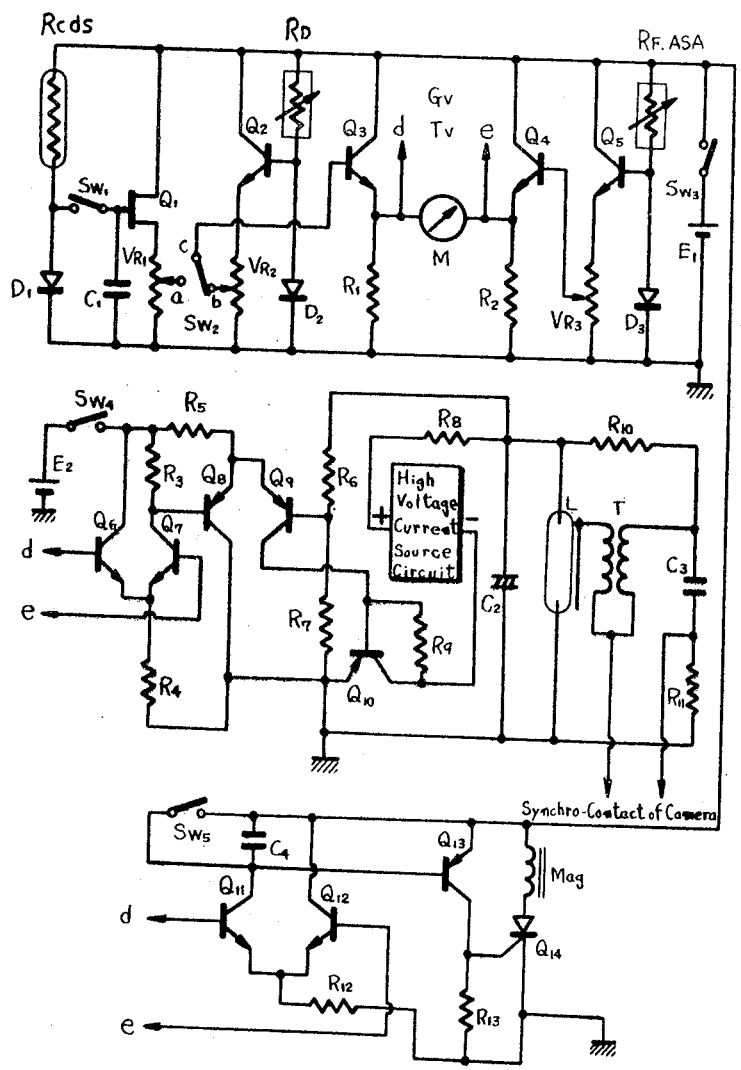
FIG. 4 is a wiring diagram of the entire system which is illustrated in FIG. 3.

Referring now to FIG. 4, there is shown therein a wiring diagram of an electronic flash apparatus and control means according to the present invention as combined with the electronic shutter control circuit of a single lens reflex camera.

FIG. 4 illustrates the battery $E_1$, a current source switch $SW_3$, and a change-over switch $SW_2$ which corresponds to the switch illustrated in FIG. 3. This switch $SW_2$ is placed in engagement with the contact a to bring about control of the electronic shutter-operating means without flash illumination, the switch $SW_2$ being placed in engagement with the contact b in order to bring about operation of the electronic flash means. A switch $SW_1$ is provided for memory or storage operation, this switch being automatically displaced from its closed to its open position just before the mirror of the camera is swung up so that it no longer extends across the optical axis in a camera of the single lens reflex type where the light is measured internally after passing through the objective. A switch $SW_5$ is displaced from its closed to its open position in synchronism with opening of the shutter, controlling in this way the constant-current charge starting time of the timing capacitor $C_4$.

Assuming that the switch $SW_2$ is in engagement with the contact a, then the structure of FIG. 4 brings about operation of the electronic shutter-operating means through the electronic shutter-control means in the following manner:

The brightness of the light at the object is received in the camera through the objective and is converted by the photoconductive element Rcds and the logarithmic transformation element $D_1$ into a voltage output which is proportional to the logarithm of the brightness value of the light at the object which is to be photographed. This voltage is produced across the logarithmic transformation element $D_1$. Through the switch $SW_1$, which is closed at this time, the memory or storage capacitor $C_1$ is charged in accordance with the output voltage, so that in this way the memory capacitor $C_1$ is provided with a charge corresponding to the brightness of the light at the object which is to be photographed. By way of a high input resistance type of variable gain amplifier formed by the field effect transistor $Q_1$ and the variable resistor $VR_1$, $\gamma$ compensation is carried out in a manner including the photo-resistance characteristic of the photoconductive element Rcds, the logarithmic transformation (compression) characteristic of the logarithmic transformation element $D_1$ and the logarithmic expansion characteristic of a logarithmic expansion transistor $Q_1$. Then, as is well known, in a buffer circuit constituted by the transistor $Q_3$ and the resistor $R_1$, an electrical quantity corresponding to the value $B_v$ of object brightness value B according to the APEX system is obtained across the resistor $R_1$. The aperture setting A and the film speed S are used to set the variable resistor $R_{F\ ASA}$ so as to introduce these values, and a logarithmic transformation element $D_3$ is connected to the latter variable resistor, this circuit also including the variable gain amplifier constituted by the transistor $Q_5$ and the variable resistor $VR_3$, as well as a buffer circuit constituted by a transistor $Q_4$ and the resistor $R_2$. With this circuit arrangement and in the manner described above there is achieved an electrical quantity corresponding to the value $(A_v - S_v)$ based upon the values of these variables as obtained across the resistor $R_2$ in accordance with the APEX system. Therefore, by obtaining the difference between the electrical quantity corresponding to the value $B_v$ and the electrical quantity corresponding to the value $(A_v - S_v)$ there is achieved an electrical quantity corresponding to the exposure time $T_v$ according to the APEX system. Thus, the electrical connection shown at the upper part of FIG. 4 between the junction between transistor $Q_3$ and the resistor $R_1$ and the junction between transistor $Q_4$ and the resistor $R_2$ will register the differential voltage Vde, and this amount corresponds to the value $T_v$ and may be shown on the linear meter M which has a scale provided with uniform graduations and which may directly indicate the exposure time according to the APEX system.

The electronic control means shown at the upper part of FIG. 4 is electrically connected to an electronic shutter-operating means shown at the lower part of FIG. 4 through the conductors d, e. This latter shutter-operating means is in the form of a logarithmic expansion and timing charge circuit having the transistors $Q_{11}$ and $Q_{12}$ whose bases are respectively connected with the conductors d and e. This circuit further includes the resistor $R_{12}$, the timing capacitor $C_4$, and the switch $SW_5$. As is known, when an input is applied to the bases of the transistors $Q_{11}$ and $Q_{12}$, the collector current of transistor $Q_{11}$ has a value corresponding to the logarithmic expansion of value $T_v$, which is to say a value which is inversely proportional to the exposure time. The timing switch $SW_5$ is displaced from its closed to its open position in synchronism with opening of the shutter, so that upon opening of the shutter the timing capacitor $C_4$ is charged with a constant current. When the voltage across the timing capacitor $C_4$ reaches the threshold value of the switching circuit constituted by the transistor $Q_{13}$, a resistor $R_{13}$, an SCR $Q_{14}$ and an electromagnet Mag for triggering the shutter-closing component, the shutter closes and the exposure is terminated. It is well known that if the timing-charge current value, the capacitance of the timing capacitor, and the threshold value of the switching circuit are selected in such a way that the time which elapses up to closing of the shutter is an exposure time corresponding to the value $T_v$, then the exposure time is automatically controlled to achieve a proper exposure.

Assuming now that the change-over switch $SW_2$ has been displaced so as to engage the contact $b$, then the structure is set to operate the electronic flash means illustrated in FIG. 4 just above the electronic shutter-operating means. FIG. 4 illustrates an example of an electronic flash circuit according to the present invention where the amount of flash illumination is controlled by variation of the voltage across the main discharge capacitor used to control the discharge tube from which the light issues. This control is based on the fact that the flash guide number G is proportional to the voltage across the main discharge capacitor as indicated by the equation (3). The electronic flash circuit means has five sections as follows: The logarithmic expansion section formed by the transistors $Q_6$ and $Q_7$, the bases of which are respectively connected through the conductors $d$ and $e$ to the computing means which determines the flash guide number $G_v$ as described above; the comparison circuit section formed by the transistors $Q_8$ and $Q_9$; the control section constituted by the transistor $Q_{10}$; the high voltage current source section designated by the block at the central part of the electronic flash means in FIG. 4; and the flash circuit section formed by the main discharge capacitor $C_2$, a xenon discharge tube L, a trigger transformer T and a trigger capacitor $C_3$. This circuit also includes the several resistors $R_3$–$R_{11}$ which are provided so that the latter sections all function in the best possible manner, and in addition there is a battery $E_2$ for actuating the logarithmic expansion circuit and the comparison circuit, this battery being connected into the circuit through the current source switch $SW_4$.

It is apparent that, in the manner described above in connection with FIG. 2, the voltage output Vde corresponding to the flash guide number $G_v$ according to the APEX system is obtained between the emitter electrodes of the transistors $Q_3$ and $Q_4$, which is to say between the conductors $d$ and $e$.

The flash guide number $G_v$ which is obtained by the computation carried out by the computing means is applied to the electronic flash means in the form of a voltage $Vde$ in accordance with the APEX system. This electrical quantity is logarithmically expanded by the transistors $Q_6$ and $Q_7$ and is transformed into a voltage value which corresponds to the flash guide number G.

Then, by means of the transistors $Q_8$ and $Q_9$, a comparison operation is carried out in order to cause the voltage across the main discharge capacitor $C_2$ to equal a value corresponding to the flash guide number G, and through the action of the transistor $Q_{10}$, the high voltage current source section charges the capacitor $C_2$. The voltage across the capacitor $C_2$ is detected by a voltage dividing circuit formed by the resistors $R_6$ and $R_7$, and the arrangement is such that when this voltage across the capacitor $C_2$ reaches a predetermined value the transistor $Q_{10}$ is blocked and becomes non-conductive. The capacitor $C_2$ which thus has been electrically charged in accordance with the flash guide number G determined by the computing means is connected to the flash circuit. When the synchro-contact of the camera is closed, the discharge tube L is triggered and a flash corresponding to the flash guide number is provided. This flash section is identical with the circuit which is used for common and well known electronic flash apparatus.

As was pointed out above, it is possible to achieve the above results also when the invention is applied to structures which use the series and parallel quench method, the variable capacitance discharge capacitor method, and the mechanical control method. In particular, although with the above example the response speed is somewhat slow (requiring a somewhat longer time than the quench method to automatically apply a voltage which is proportional to the flash guide number G to the discharge capacitor), it is sufficient to follow and respond to mechanical manipulations in connection with the diaphragm and the film speed as well as the setting of the distance between the camera and the object which is to be photographed. There is therefore achieved the advantage of alleviating the rapid response which has been conventionally required in flash guide number control. With a conventional automatic light-adjustment electronic flash apparatus, troublesome and inconvenient manipulations are essential since the speed of the film and the diaphragm must be set both in the camera as well as in the electronic flash apparatus. However, according to the present invention such settings need be made only in the camera itself, so that the manipulations are much easier to carry out. In addition, in accordance with the present invention, it is possible to freely set the diaphragm at any desired setting while achieving a proper exposure without any complicated manipulations. With a conventional automatic light adjustment electronic flash apparatus, it is necessary in some cases to provide a fixed, predetermined diaphragm setting and then the flash guide number is determined in accordance with the distance between the object and the camera, while with other kinds of apparatus the flash guide number is fixed so that the diaphragm setting is automatically controlled in accordance with the distance between the object and the camera. In contrast, however, according to the present invention the diaphragm can be freely set at any desired value in a highly convenient manner as mentioned above so that it is possible to use the apparatus with great flexibility and over a far wider range of apertures so as to obtain a far more effective exposure than has heretofore been possible.

As pointed out in detail above, according to the present invention, automation of the electronic flash apparatus, particularly in connection with single lens reflex cameras, can be achieved in a highly convenient manner. Thus, there is provided in accordance with the invention in a simple and convenient manner an electronic flash means which functions fully automatically with any selected diaphragm setting, with any film speed, and with any selected distance between the object to be photographed and the camera.

What is claimed is:

1. In a camera, electrical computing means for computing a flash guide number, electronic input means connected electrically with said computing means for supplying to the latter signals in the form of electrical quantities adjusted to conform to the APEX system and respectively corresponding to a selected aperture setting, a selected distance setting, and a selected film speed setting, said computing means being electrically connected with said input means for receiving therefrom on the one hand a signal corresponding to said distance setting and on the other hand a signal corresponding to the difference between said film speed setting and said aperture setting, said computing means being electrically connected with said input means for computing the difference between the latter signals received therefrom for computing a flash guide number in accordance with said signals, and electronic flash means for providing flash illumination, said electronic flash means being electrically connected with said computing means for determining the amount of the flash illumination in accordance with the flash guide number computed by said computing means.

2. The combination of claim 1 and wherein an electronic shutter-operating means operates a shutter of the camera to determine the exposure time, and electronic control means electrically connected with said electronic shutter-operating means for controlling the latter, and that part of said electronic input means which provides signals according to the selected aperture and film speed settings forming part of said shutter-control means.

3. The combination of claim 2 and wherein said shutter-control means includes an electronic means for providing a signal according to the intensity of light at the object which is photographed.

4. The combination of claim 3 and wherein a switch means is electrically connected on the one hand with the electronic means for providing a signal according to the light intensity at the object which is to be photographed and on the other hand with that part of the electronic input means which provides a signal according to the selected distance for rendering the latter part of said electronic input means operative and the electronic means for providing a signal according to light intensity inoperative when an exposure is to be made with flash illumination and for rendering that part of said electronic input means which provides a signal according to distance inoperative and said electronic means for providing a signal according to light intensity operative when an exposure is to be made without flash illumination.

* * * * *